A. H. STONE.
EXTENSION TABLE.
APPLICATION FILED NOV. 25, 1908.
923,309.
Patented June 1, 1909.
4 SHEETS—SHEET 2.
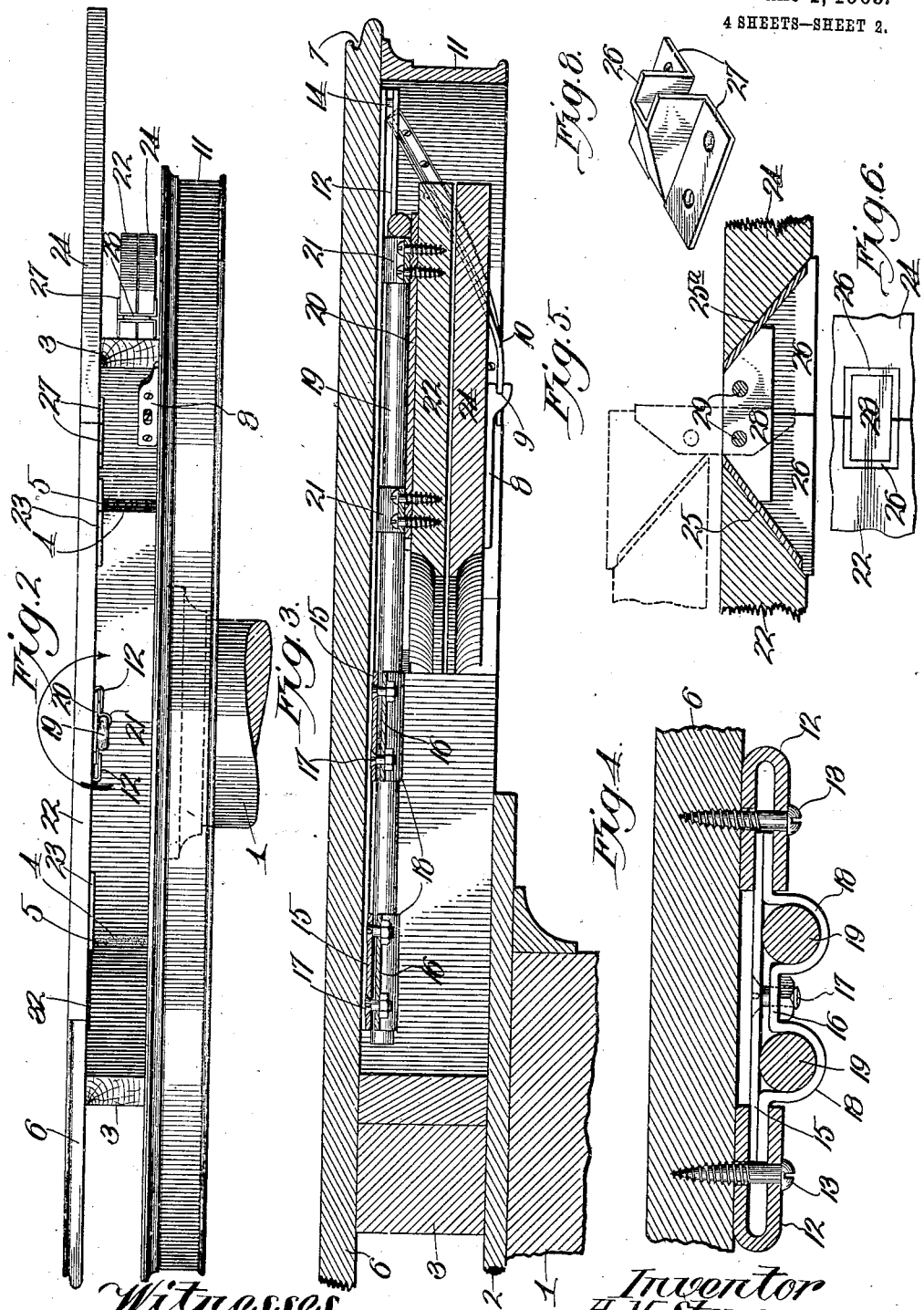
Witnesses
Frank R. Glore
H. C. Rodgers
Inventor
A. H. Stone
By George J. Shope Atty.

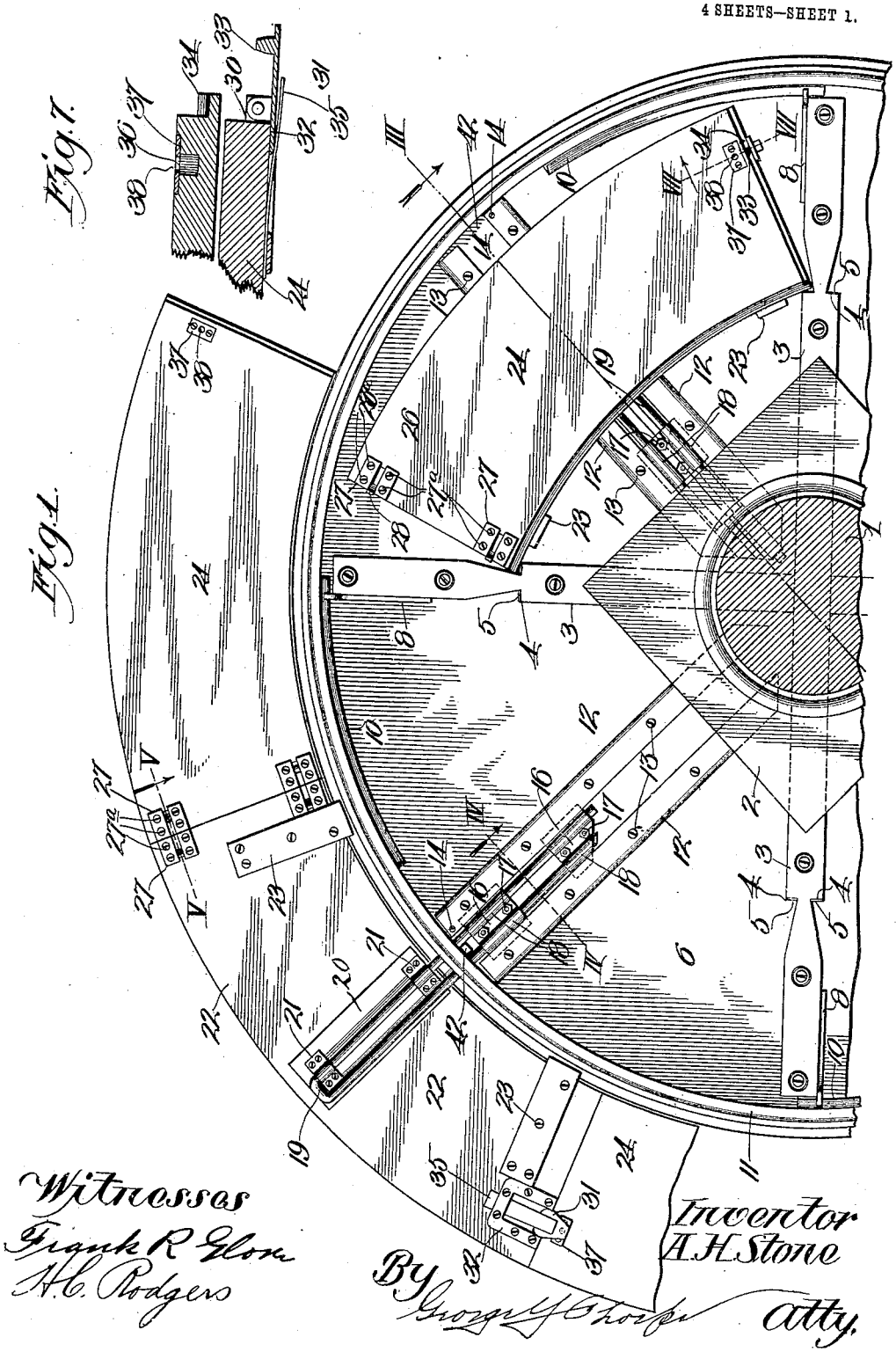

A. H. STONE.
EXTENSION TABLE.
APPLICATION FILED NOV. 25, 1908.
923,309.
Patented June 1, 1909.
4 SHEETS—SHEET 3.
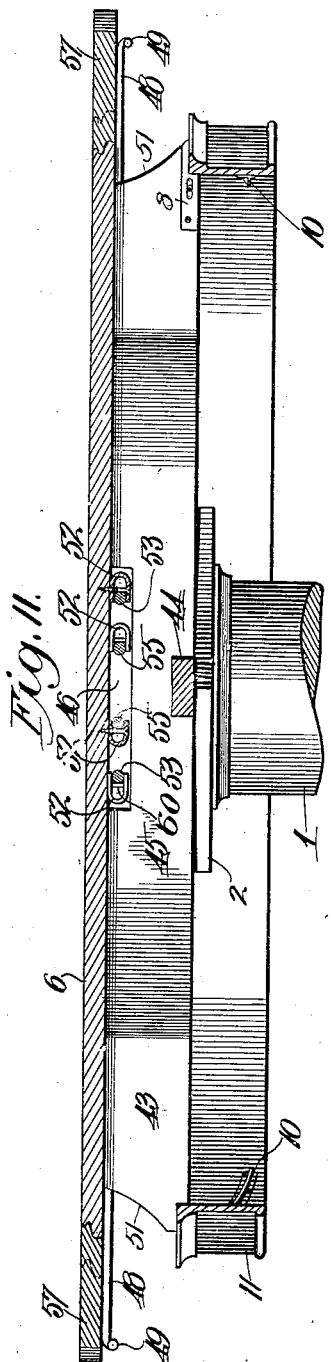
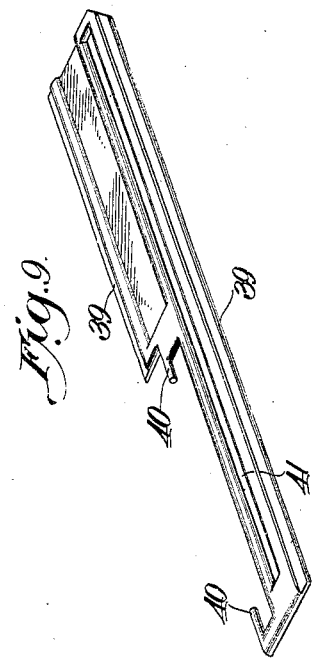
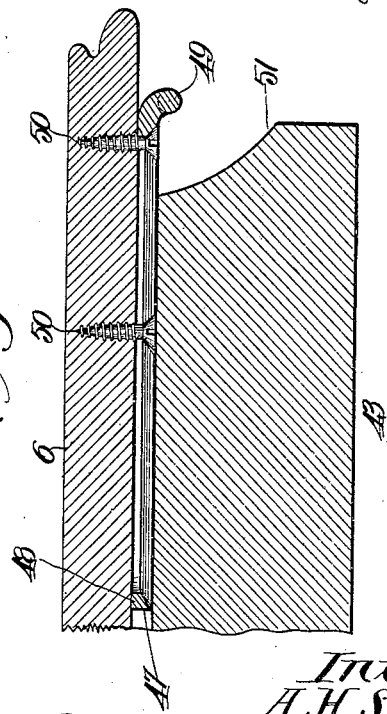
Witnesses
Frank R. Glow
H. C. Rodgers
Inventor
A. H. Stone.
By George F. Thorpe
Atty.

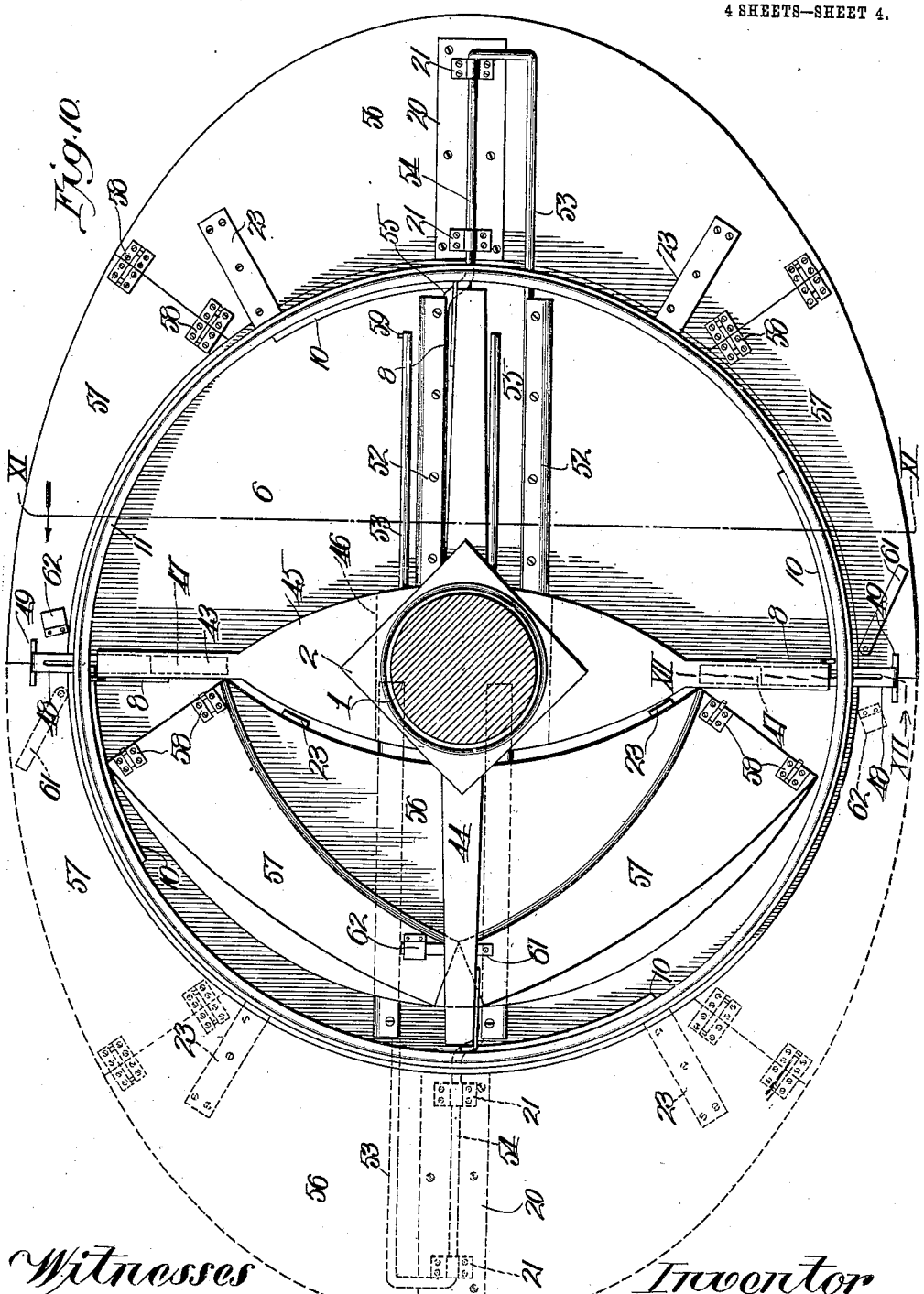

UNITED STATES PATENT OFFICE.

ANDREW H. STONE, OF KANSAS CITY, MISSOURI.

EXTENSION-TABLE.

No. 923,309.

Specification of Letters Patent.

Patented June 1, 1909.

Application filed November 25, 1908. Serial No. 464,505.

*To all whom it may concern:*

Be it known that I, ANDREW H. STONE, a citizen of the United States, residing at Kansas City, in the county of Jackson and State of Missouri, have invented certain new and useful Improvements in Extension-Tables, of which the following is a specification.

This invention relates to circular tables of that class embodying a central leg or pedestal, a circular top, a circular rim and leaves or extensions to peripherally surround the circular top and thus increase the size and capacity of the table, my primary object in this case being to provide main leaves or extensions hingedly-carrying supplemental leaves, adapted to be unfolded when in use and folded when not in use, the sets of leaves when folded and not in use being stored below the table top within the rim.

A further object is to produce a table having a circular top and leaves or extensions of such form and arrangement that the table when enlarged to accommodate a greater number of persons, may be of elliptic or oval form in plan view.

With these and other objects in view the invention consists in certain novel and peculiar features of construction and organization as hereinafter described and claimed; and in order that it may be fully understood reference is to be had to the accompanying drawings, in which:

Figure 1 is a horizontal section through the pedestal of a circular table embodying my invention; said figure also disclosing the underside of a fragment of the table-top and rim, with one set and a portion of a second set of the leaves in unfolded and operative position and a second set of said leaves in folded and inoperative position. Fig. 2 is an edge view of the upper part of the table as arranged in Fig. 1, with the rim displaced or lowered to permit the leaves to be disposed in operative or inoperative position. Fig. 3 is an enlarged vertical section taken on the line III—III of Fig. 1. Fig. 4 is a section on the line IV—IV of Fig. 1, on a larger scale than Fig. 3. Fig. 5 is a section on the line V—V of Fig. 1, on the same scale as Fig. 4. Fig. 6 is a plan view of that part of the table disclosed by Fig. 5. Fig. 7 is a section of a set of the leaves when folded, the section being taken on the line VII—VII of Fig. 1. Fig. 8 is a detail perspective view of a hinge member or bracket. Fig. 9 is a detail perspective view of a modified form of slide frame. Fig. 10 is a section taken through the pedestal of the table and viewing the top of the latter from below, the table being of modified construction so as to be capable of extension from a circular into an elliptic or oval table. Fig. 11 is an enlarged vertical section taken on the line XI—XI of Fig. 10. Fig. 12 is a vertical section on the line XII—XII of Fig. 10.

In the said drawings, 1 indicates a leg or pedestal of any suitable form and construction, surmounted by a cap 2, and by crossed bars 3 arranged radially with respect to the axial center of the pedestal, and said bars at suitable points are notched to provide outwardly-disposed shoulders 4 equipped with sound-deadening pads or cushions 5, and secured rigidly by preference, upon bars 3 is a circular top 6, which by preference, is peripherally recessed as at 7, for purposes of embellishment and another purpose hereinafter referred to.

8 indicates bars secured to and projecting outward beyond the ends of bars 3 and provided with notches or grooves 9 in their outer ends, receiving the curved pitched tongues 10 secured to the inner side of the circular rim 11 below and parallel with the table top, the arrangement being such that said rim when rotated in one direction or the other will be vertically raised or lowered. When so raised the rim bears squarely against the under side of the table top 6 as shown in Fig. 3, and when lowered it is spaced from the table top a distance substantially equal to its depth, as shown in Fig. 2.

12 indicates a pair of parallel guide-bars of U-shape in cross-section secured to the underside of the table top centrally between and alternately with respect to the crossed bars, each pair of U-shaped guide-bars being spaced so as to provide between them a slot extending radially of the table top, screws 13 being employed to fasten the guide-bars to said top. One of each pair of the guide-bars is provided at its outer end and inner corner with a stop-pin 14 to limit outward sliding movement of a frame consisting of a pair of slidable cross-heads and a U-shaped rod. Each cross-head consists of a horizontal top-plate 15 projecting at its side edges into the channels of the adjacent U-shaped guide-bars and a bottom plate 16 likewise projecting at its side edges into said channels and secured to the top-plate centrally by a clamping bolt 17, and provided at opposite sides of the clamping bolt and between the U-shaped guide-bars, with depending U-shaped portions 18 to receive the arms of the U-shaped rod 19, the bolts 17 of the cross-heads being utilized to clamp the latter and rods 19 rigidly together so as to constitute a rigid frame capable of sliding on guide-bars 12 until the outer end of rod 19 is inward of the circle described by the rim 11, the outward movement of said slidable frame being limited as hereinbefore suggested by the engagement of the outermost cross-head with stop-pin 14.

20 are plates of suitable material each carrying a pair of clips 21 pivotally embracing an arm of one of the rods 19 beyond the cross-heads thereof, and secured rigidly upon each plate 20 is a segment-shaped leaf or extension 22, the inner edge of which is struck from the same radius as the periphery of the table top, and the lower corner of such edge is recessed to correspond approximately with the recess in the edge of the table top, so that when said leaf or extension is fitted against the edge of the top the projecting portions of the top and leaves produced by recessing as explained, will fit snugly in the recesses of the leaves and top respectively.

23 indicates a pair of plates of suitable material, secured to the underside and near the ends of each leaf or extension 22 and projecting beyond the inner edge thereof so as to underlie and bear against the underside of the table top, when in operative position, it being noticed in this connection by reference to Fig. 1, that a leaf or extension is fitted against the edge of the top with plates 23 underlying the latter, there is sufficient space between the outermost cross-head and the alined stop-pin 14, to permit the leaf or extension to move radially outward a sufficient distance for the inner ends of plates 23 to clear the outer edge of the top so that the latter may be turned on rod 19 as a pivot in the direction indicated by the arrow, in Fig. 2, until it is disposed horizontally below said rod with its lower face uppermost as shown in Figs. 2 and 3. When in this position it can be slid inward with the slide-frame under the top 6, until its inner edge is arrested by contact with the cushioned shoulders 4, as shown at the right hand side of Figs. 1 and 2 and in Fig. 3.

To fill the spaces between the leaves or extensions 22, hereinafter termed the main leaves, I provide leaves or extensions 24 of similar form and size, each supplemental leaf 24 being hingedly carried by one of the main leaves 22 in such a manner that it can be folded upon the latter with their upper or finished faces adjacent but not in contact so as to avoid marring the finish of either. To connect said main and supplemental leaves together as explained, I provide hinges constructed as follows: In corresponding ends the main and supplemental leaves are provided with registering notches 25—25$^a$ with the base ends of said notches inclined and converging upward with respect to the adjacent vertical edges of the leaves as shown in Fig. 5, and fitting in said notches are brackets 26 of trapezium-shape in side view, the companion brackets of each hinge being flush at their outer ends or edges with the adjacent ends or edges of the leaves, so that when the latter occupies an operative or unfolded position the companion brackets form an opening having parallel side-walls and upwardly-converging end-walls. The brackets are secured rigidly to the leaves in any suitable manner though preferably they are provided with laterally projecting horizontal flanges 27 fitted against and secured by screws 28 to the undersides of the leaves.

28 is a link of truncated V-shaped in side view fitting snugly in the upper end of the opening formed by each pair of companion brackets and pivoted to the same at 29, the arrangement and proportion of the parts being such that when the leaves are unfolded the tapering walls of the brackets bear squarely against the tapering edges of the links and as a result the supplemental leaves are held in the same horizontal plane as their companion main leaves, it being also obvious by reference to Fig. 5, that when the supplemental leaves are folded over the main leaves, as indicated by dotted lines in the last-named figure, the links assume vertical positions and support the hingedly connected ends of the leaves a slight distance apart.

By preference there will be four main and four supplemental leaves employed to enlarge the table top, the free end of each main leaf and the free end of the adjacent supplemental leaf being rabbeted for mutual engagement so as to produce an interlocking or rabbet-joint extending radially of the top when the leaves or sections are fitted operatively against the edge of the top. To support the free ends of each companion pair of main and supplemental leaves a slight distance apart when in folded relation, the projecting rib formed by rabbeting the end of each main leaf is cut away at 30 to receive a catch 31 pivoted to and within a frame 32 secured to the underside of such main leaf, and said catch is provided with a tooth 33 to engage a socket 34 formed in the rib at the free end of the companion supplemental leaf, as shown clearly in Fig. 7, a flat spring 35 being clamped rigidly to the main leaf by said frame 32 and overlapping the catch and adapted to hold the same with its tooth in said socket or to hold said catch in a horizontal position with its tooth engaging a socket 36 in the underside of the supplemental leaf of the adjacent main leaf, that is to say, the supplemental leaf which forms a rabbet-joint with the main leaf, and to avoid enlargement of the socket 36 by wear, a plate 37 is secured to the underside of the supplemental leaf and is also provided with a hole 38 registering with the said socket, to receive the tooth of the catch.

Assuming that the table is in normal or contracted condition and that it is desired to enlarge it by arranging its leaves in operative position around and in the plane of the top, the operator first lowers the rim 11 by turning it as explained. The leaves or extensions are then drawn outward from under the top above the rim. They are then turned on rods 19 as explained so as to present the faced or finished surfaces of the main leaves upwardly and at the same time dispose the latter in the same horizontal plane as the top 6. The said leaves are then pushed inward until their recessed inner edges form rabbet-joints with the periphery or edge of the top. The catches 32 are then disconnected from the supplemental leaves by swinging them from the position shown in full lines to the position shown in dotted lines, Fig. 7. The supplemental leaves are then swung on their hinges to unfolded position so that their free ends shall form rabbet-joints with the rabbeted ends of the adjacent main leaves, the rabbeted inner edges of the supplemental leaves at the same time forming rabbet-joints with the periphery or edge of the table top; it being noticed that when the supplemental leaves are unfolded, the teeth of the catches automatically engage sockets 36 and thus interlock each main leaf with the supplemental leaf carried by the adjacent main leaf. The rim is then raised by reversing the movement last imparted to it.

To restore the table to normal or contracted condition, the supplemental leaves are swung back to former position over the main leaves, and the rim is lowered. The catches of the latter are then caused to engage the sockets 34 of the former. The main and supplemental leaves are then drawn outward to withdraw plates 23 from under the table top, and then said leaves are turned over on the rods 19 so as to dispose them in a horizontal plane below the top and above the lowered rim. The leaves are then slid inwardly until arrested by contact with the cushioned shoulders. The movement of the rim is then again reversed to reëlevate it, in which position it hides the folded leaves or extensions.

In Fig. 9 I show a cast-metal slidable frame as distinguished from one made of a U-shaped rod equipped with clips. The said cast-metal frame is rabbeted to produce the parallel tongues 39, one terminating short of the outer and of the other, and outward of said short tongue and at the same side, the frame is recessed and provided with alined hinge-pins 40 for engagement by the hinge clips 21. This cast-metal frame is adapted to fit between a pair of guide-bars 12 with its tongues fitting in the grooves or channels of said guide-bars, the tongues therefore being equivalents of the cross-heads. The slidable frame is also provided with a longitudinal slot 41 to receive a stop 42, corresponding to stop-pins 14, except that it depends from the table top 6 instead of being carried by one of the guide-bars 12, it being noticed by reference to Fig. 1 that the table top 6 is equipped with stops 42 as well as stops 14 so that either form of slide frame may be employed without necessitating any change of construction in the table as a whole, in fact the pins 14 may be omitted entirely as the stops 42 may be used as an abutment for the outermost cross-heads as well as for the inner end of the cast-metal slide frame.

Referring now to the table exemplified in Figs. 10 and 11 particularly, it will be seen that the same is of identical construction as that hereinbefore described except in the fact that it is equipped with only two main leaves, each carrying a pair of supplemental leaves, and in other secondary features to accommodate a wide range of radial movement on the part of the main leaves, the parts identical in both types of construction being correspondingly numbered. Referring now to the parts peculiar to the elliptic-top table, 43 and 44 are cross-bars underlying the table top 6 and secured upon the cap 2 of the pedestal, the bar 43 being also rigidly secured in any suitable manner to the table top and by preference formed with an elliptical enlargement 45 centrally between its ends and with a central recess 46 in its upper edge. The bar 44 extends at right-angles to bar 43 and by preference is stepped therein as shown in Fig. 11, and is spaced below the top 6 a distance slightly exceeding twice the thickness of the table top for a purpose which hereinafter appears. The cross-bar 44 is shown in the drawings relatively narrower than it will be in practice in order that parts in the background of Fig. 10 shall not be hidden. The bar 43 is provided in its upper edge and at its outer ends with grooves 47 and fitting slidingly in said grooves are longitudinal slide-bars 48 provided with handle portions 49 at their outer ends, which portions by abutment against the outer ends of said bar 43 limit inward movement of said slide-bars, outward-movement of the slide-bars being limited by the innermost of the pairs of guide-screws 50 extending through the longitudinal slots of the bars into the table top 6, it being noticed by reference to Fig. 12 that the outer ends of the said bars 43 are recessed at 51 to enable the operator to more easily grasp the handle portions of said slide-bars preliminary to drawing them outward, it being further noticed that the outer ends of said slide-bars are turned downward in order that they may be more readily grasped and manipulated.

52 indicates a pair of guide-bars corresponding in form to guide-bars 12 and arranged in parallel relation at opposite sides of cross-bar 43, said parts of bars being arranged out of alinement and at right-angles to said bar 43.

A pair of slide-frames arranged radially of the table top, each consists of an arm 53 and a companion arm consisting of a short outer portion 54 and a long inner portion 55, the arm being bent laterally at the junction of said portions so that the portions 54 of the two frames shall be longitudinally alined and the portions 55 at opposite sides and equal distances from the center of the table top in order that the long arms 53 and the long portions 55 of the companion arms shall not conflict with each other, as shown clearly in Figs. 10 and 11, it being noticed in this connection that said arms 53 and armportions 55 extend through the recess or opening 46 of bar 43.

56 indicates a pair of main leaves arranged diametrically opposite each other and centrally with respect to portions 54 of the slide-bars, said leaves at their inner edges being adapted to fit snugly against the edge of the table top like the main leaves of the preferred form of construction hereinbefore described. The outer edge of said leaves 56 are struck from a shorter radius than their inner edges by preference so that the leaves shall diminish in width from their centers toward their ends, the leaves being also proportioned that when in folded or in operative position they shall lie below the table top and within the circle described by the rim, it being further noticed that said leaves are provided with plates 23 at their undersides to project inwardly under the top 6 when the table is in extended condition.

57 indicates a pair of supplemental leaves hinged at 58 to the opposite ends of each main leaf by means of hinges of the type hereinbefore described and shown clearly in Fig. 5, these hinges permitting the said supplemental leaves to be folded over the main leaves and occupy the relation shown at the left-hand side of Fig. 10, it being further noticed that the supplemental leaves are adapted to form tight joints with the edge of the table top and that the adjacent leaves 57 are adapted to form tight joints at their free ends when in operative position, as indicated by full lines and dotted lines in Fig. 10 and thus in conjunction with the main leaves, form a symmetrical, elliptical or oval table top, the supplemental leaves converging or growing narrower from their hinged to their free edges which are supported by slide-bars 48, as also shown in Fig. 10.

The main leaves are provided at their inner sides with plates 20 equipped with clips 21 pivotally engaging the short-arm portions 54 of the slide-frames and are capable of being swung from one side of said frames to the other in one direction, the arms 53 of said frames preventing swinging movement in the opposite direction, and in order to prevent the leaves from being drawn out too far preliminary to the extension of the table, the arms 53 of the slide-bars are provided with outwardly-projecting stop-pins 59 to abut against stops 60 secured to the guide-bars 52 engaged by said arms 53, the companion guide-bars 52 slidingly receiving the long-arm portions 55 of said slide-frames. When the supplemental leaves are folded they are preferably held together at their free ends by means of a turn-button or latch 61 pivoted to the under side of one of them and a clip 62 secured to the under side of the other.

Assuming that the table is in normal or contracted condition and that it is desired to extend it, the operator lowers the rim, slides the leaves outward, rotates said leaves to present the finished surfaces or faces of the main leaves upwardly and disengages the turn-buttons 61 from the clips 62 and slides the leaves inward until plates 23 underlie the edge of the table top. He then draws slide-bars 48 outward and unfolds the supplemental leaves and swings them down to operative position until they engage the table top at their inner edges and rest upon bars 48 at their free ends. This manipulation is reversed in order to restore the table to normal condition, and when in such condition the rim hides all of the movable parts of the table from view.

From the above description it will be apparent that I have produced a circular table which may be readily varied in size without the use of what are generally known as detachable leaves or sections and which is obviously susceptible of modification in various particulars without departing from the spirit and scope or sacrificing any of the advantages of the appended claims.

Having thus described the invention what I claim as new and desire to secure by Letters-Patent, is:—

1. In an extension table, a circular top and a circular rim relatively movable toward and from each other vertically and relatively rotatable, a pedestal and a cross bar rigid with respect to each other and one of said movable parts, frames carried by and at the underside of the table top and radially movable with respect to the latter, main leaves pivoted to the slide frames so as to turn from a position at one side of the same to the opposite side, supplemental leaves hinged to the main leaves, and means to secure the free ends of the supplemental leaves in the horizontal plane of the main leaves and of the table top after the main leaves have been slid outward and the supplemental leaves have been unfolded.

2. In an extension table, a circular top and a circular rim relatively movable toward and from each other vertically and relatively rotatable, a pedestal and a cross bar rigid with respect to each other and one of said movable parts, frames carried by and at the underside of the table top and radially movable with respect to the latter, main leaves pivoted to the slide frames so as to turn from a position at one side of the same to the opposite side, supplemental leaves hinged to the main leaves, means to secure the free ends of the supplemental leaves in the horizontal plane of the main leaves and of the table top after the main leaves have been slid outward and the supplemental leaves have been unfolded, and plates secured to the underside of the main leaves and projecting inward thereof to engage the underside of the table top after said leaves have been drawn outward, to prevent tilting movement thereof.

3. In an extension table, a circular top and a circular rim relatively movable toward and from each other vertically and relatively rotatable, a pedestal and a cross bar rigid with respect to each other and one of said movable parts, guide bars secured to and arranged radially of the underside of the table top, slide frames engaging the guide bars and movable radially of the table top, main leaves pivoted to the slide frames so as to be capable of being turned from a point above to a point below said frames or vice versa, and adapted when above the slide frames to occupy the horizontal plane of and fit against the edges of the table top and when below said frames to be capable of occupying a position below the table top and within the circle described by the rim, means to prevent tilting of said leaves when engaged with the edge of the table top, and supplemental leaves hinged to the main leaves and adapted to be folded toward the finished surface or face of the latter and with the same occupy a position below the table top and when unfolded to occupy the horizontal plane of the main leaves and fit at their inner edges against the edge of the table top between the main leaves.

4. In an extension table, a circular top and a circular rim relatively movable toward and from each other vertically and relatively rotatable, a pedestal and a cross bar rigid with respect to each other and one of said movable parts, guide bars secured to and arranged radially of the underside of the table top, slide frames engaging the guide bars and movable radially of the table top, main leaves pivoted to the slide frames so as to be capable of being turned from a point above to a point below said frames or vice versa, and adapted when above the slide frames to occupy the horizontal plane of and fit against the edges of the table top and when below said frames to be capable of occupying a position below the table top and within the circle described by the rim, means to prevent tilting of said leaves when engaged with the edge of the table top, supplemental leaves hinged to the main leaves and adapted to be folded toward the finished surface or face of the latter and with the same occupy a position below the table top and when unfolded to occupy the horizontal plane of the main leaves and fit at their inner edges against the edge of the table top between the main leaves, means to secure the free ends of the supplemental leaves when unfolded against vertical movement, and means for securing the supplemental leaves in folded relation to the main leaves.

5. In an extension table, a circular top and a circular rim relatively movable toward and from each other vertically and relatively rotatable, a pedestal and a cross bar rigid with respect to each other and one of said movable parts, guide bars secured to and arranged radially of the underside of the table top, slide frames engaging the guide-bars and movable radially of the table top, means for limiting the outward movement of said slide frames, main leaves pivoted to the slide frames so as to be capable of being turned from a point above to a point below said frames or vice versa, and adapted when above the slide frames to occupy the horizontal plane of and fit against the edges of the table top and when below said frames to be capable of occupying a position below the table top and within the circle described by the rim, means to prevent tilting of said leaves when engaged with the edge of the table top, and supplemental leaves hinged to the main leaves and adapted to be folded toward the finished surface or face of the latter and with the same occupy a position below the table top and when unfolded to occupy the horizontal plane of the main leaves and fit at their inner edges against the edge of the table top between the main leaves.

6. In an extension table, a pedestal, a cross bar above and rigid with the same, a circular table top above and secured to the cross bar, grooved bars secured to the cross bar, a circular rim of slightly smaller diameter than the table top below the same and provided at its inner side with curved tongues pitched to dispose their ends in different vertical planes and engaging the grooves of said bars so that when the rim is rotated in one direction it will move vertically downward and when rotated in the opposite direction it will move vertically upward, radially arranged guide bars secured to the underside of the top within the circle of the rim, slide frames mounted in said bars and adapted when slid inward to lie wholly within the circle of the rim and when slid outward to project beyond and lie above the rim, main leaves pivoted to said slide frames so as to swing from a point above to a point below the same and prevented by said frames from swinging from a point above to a point below the same in the opposite direction, plates secured to the underside of said leaves to project inward and engage the underside of the table top when said leaves are extended, supplemental leaves hinged to the main leaves and adapted to fold toward the face or finished surface of the same or be unfolded and occupy the horizontal plane of said main leaves and of the table top, and means to support the free ends of the supplemental leaves when unfolded.

7. In an extension table, a pedestal, a cross bar above and rigid with the same, a circular table top above and secured to the cross bar, grooved bars secured to the cross bar, a circular rim of slightly smaller diameter than and below the table top and provided at its inner side with curved tongues pitched to dispose their ends in different vertical planes and engaging the grooves of said bars so that when the rim is rotated in one direction it will move vertically downward and when rotated in the opposite direction it will move vertically upward, radially arranged guide bars secured to the underside of the top within the circle of the rim, slide frames mounted in said bars and adapted when slid inward to lie wholly within the circle of the rim, main leaves pivoted to said slide frames so as to swing from a point above to a point below the same and prevented by said frames from swinging from a point above to a point below the same in the opposite direction, plates secured to the underside of said leaves to project inward and engage the underside of the table top when said leaves are extended, supplemental leaves hinged to the main leaves and adapted to fold toward the face or finished surface of the same or be unfolded and occupy the horizontal plane of said main leaves and of the table top, means to support the free ends of the supplemental leaves when unfolded, and means to secure the supplemental leaves in folded relation to but out of contact with the main leaves.

In testimony whereof I affix my signature, in the presence of two witnesses.

ANDREW H. STONE.

Witnesses:
 M. A. O'Donnell,
 G. Y. Thorpe.